Figure 1:
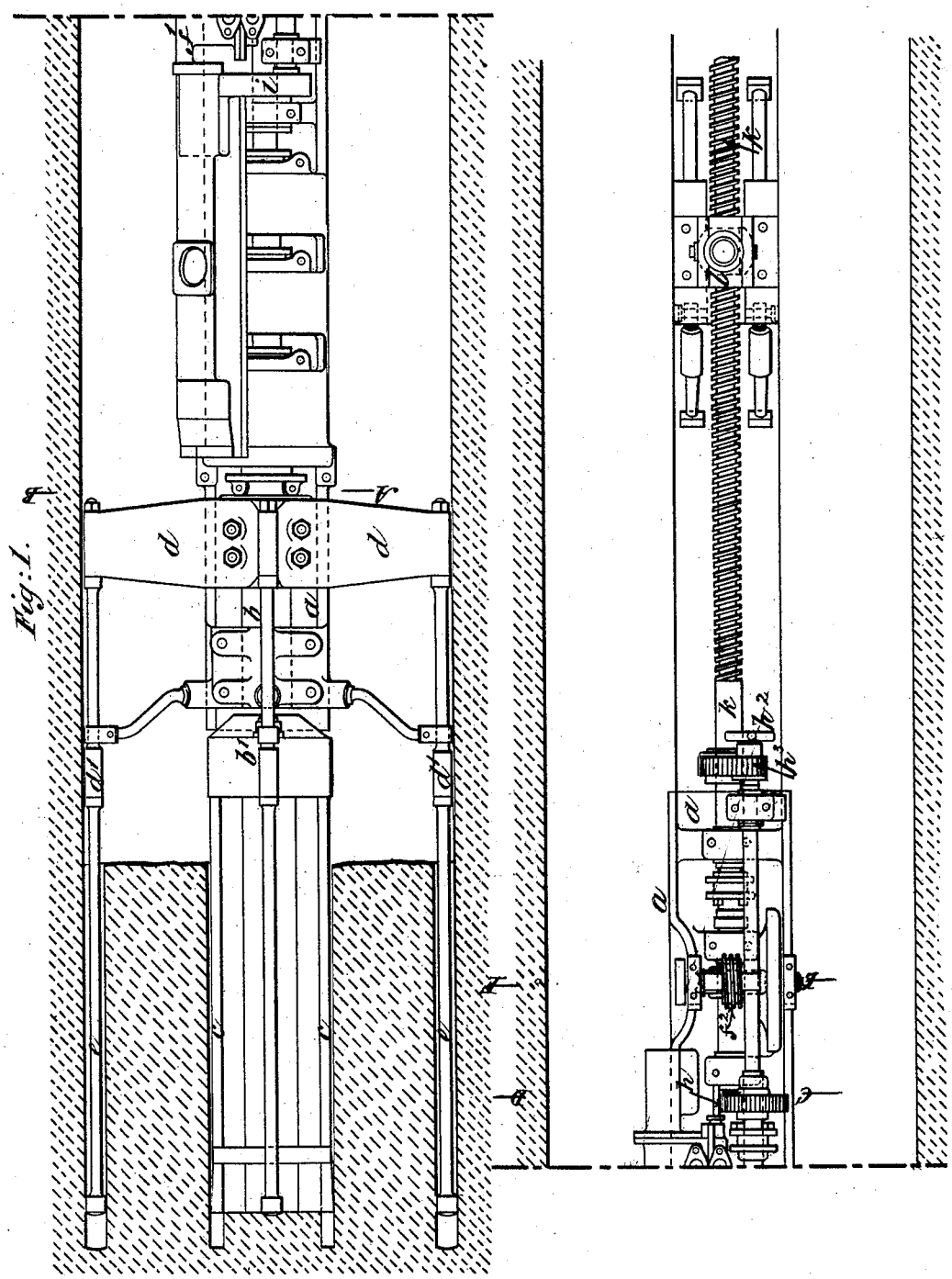

5 Sheets—Sheet 1.

H. N. PENRICE.
ROCK-BORING AND TUNNELING MACHINES.
No. 192,788. Patented July 3, 1877.

H. N. PENRICE.
ROCK-BORING AND TUNNELING MACHINES.

No. 192,788. Patented July 3, 1877.

5 Sheets—Sheet 3.

WITNESSES:

INVENTOR:
Herbert N. Penrice
By his Attorneys,
Baldwin, Hopkins & Peyton.

5 Sheets—Sheet 4.

H. N. PENRICE.
ROCK-BORING AND TUNNELING MACHINES.

No. 192,788. Patented July 3, 1877.

WITNESSES:
Wm. A. Skinkle
Henry T. Carneel

By his Attorneys,
Baldwin, Hopkins & Peyton

INVENTOR:
Herbert N. Penrice.

H. N. PENRICE.
ROCK-BORING AND TUNNELING MACHINES.
No. 192,788.  Patented July 3, 1877.
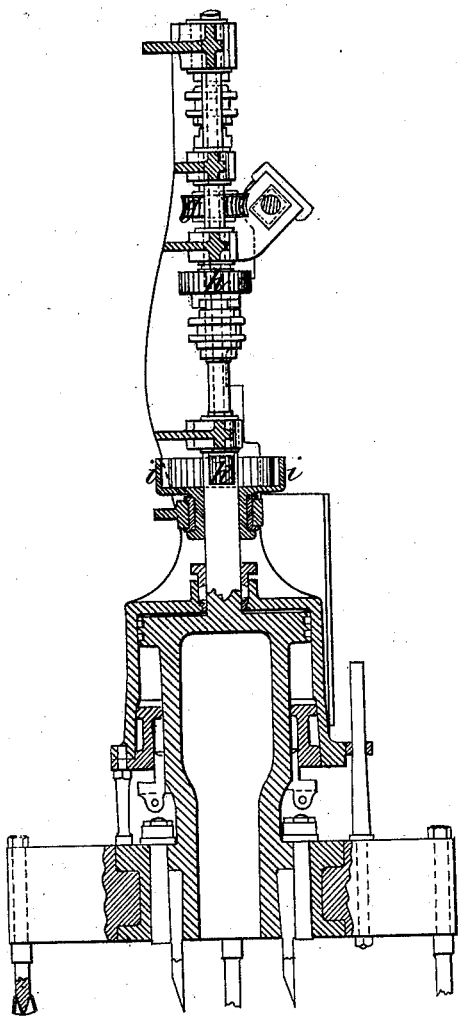
Fig: 10.
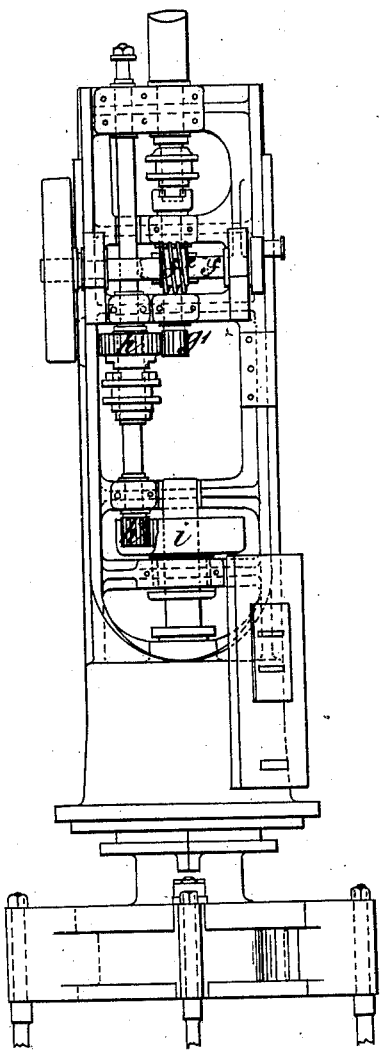
Fig: 9.
WITNESSES:
INVENTOR:
Herbert N. Penrice
By his Attorneys.

UNITED STATES PATENT OFFICE.

HERBERT N. PENRICE, OF HATFIELD, ENGLAND.

IMPROVEMENT IN ROCK-BORING AND TUNNELING MACHINE.

Specification forming part of Letters Patent No. 192,788, dated July 3, 1877; application filed March 13, 1877. Patented in England February 25, 1876, for fourteen years.

*To all whom it may concern:*

Be it known that I, HERBERT NEWTON PENRICE, of Hatfield, in the county of Herts, England, have invented new and useful Improvements in Rock-Boring, Tunneling, and Shaft-Sinking, and in machinery to be used for these purposes, which improvements are fully set forth in the following specification, reference being had to the accompanying drawings.

This invention has for its object the formation of tunnels and shafts in rock more quickly than heretofore practicable. This I effect partly by the manner in which I form a tunnel, and partly by so constructing the boring machinery that a greater amount of power may be employed to effect the boring relatively to the size of the bore.

Heretofore it has been proposed to form tunnels by employing a ram armed with chisels and receiving a reciprocating motion to cut a large annular groove and afterward removing the core, and this core requiring to be broken up by miners before it could pass the machine.

The machinery which I employ operates in this manner to cut a much smaller hole, which is subsequently enlarged before the core is removed. In order to insure the ample power requisite for rapid progress, I construct the cylinder or cylinders used for giving motion to the ram and cutting-head of a diameter nearly equal to that of the annular groove cut by the head, and I enlarge the upper part and sides of the bore in advance of the cylinders as the work progresses. The enlargement is effected by means of holes formed at the sides and top of the bore. To produce these holes three or more arms are fixed to the ram behind the cutting-head, and each arm carries a long chisel or tool. I prefer to employ a chisel or tool which does not require to be turned, and which consists of an open ring-punch with cutting-edges passing across the ring, and leaving open channels for the débris to pass. These holes may also be drilled in some cases by independent machines. The main groove and the holes at the sides and above it proceed simultaneously, and when some feet have been cut the machine is withdrawn and the holes around the main groove receive small charges of dynamite, gunpowder, gun-cotton, or other explosive. The charged holes are closed with three long steel wedges, made to fit them, and inclined in opposite directions. When the charges are fired the center wedge is forced between the other two, and is pressed out laterally from the side holes and then vertically from the top hole into the groove of the main bore. The direct explosion of the dynamite or other explosive used suffices in most cases to shatter the small core. The lower part of the bore is always preserved as the bottom, so that the machine can be moved to and fro along it in a straight line. When the material has been removed the machine is again moved forward to continue its work. It will be seen that by constructing a bore in the manner above described, a very small proportion only of the material to be removed has to be pulverized, and that the bulk of the material can be removed in comparatively large pieces, by which the amount of work required to win a large bore is greatly reduced.

The apparatus I employ for cutting the bore is constructed as follows: The cutters for cutting the annular groove act percussively, and travel slowly around the groove. The cutters consist of a series of chisels set close together in the circumference of a cylinder, except that two spaces are left for the escape of débris, and for the passage of tubes for conveying water to wash out the annular groove and cool the tools. The chisels are held by wedges in a massive cutter-head, and the wedges are locked by right and left hand nuts, over which again a keep is slid.

The edges of the chisels are placed circumferentially and alternately nearer to and farther from the center, so that they actually chase two separate grooves close together, from between which the rock flakes away as the work progresses. Thus the quantity of rock which has actually to be pulverized in forming the bore is reduced to a minimum.

The cutter holder or head is rapidly driven to and fro at the same time that it is also slowly rotated. The cutter-head is carried by a strong piston-rod or ram, which passes back through two or more cylinders, and carries pistons to work in each cylinder. The forward end of one of these cylinders is kept constantly in communication with the supply of compressed air or steam by which the engine is worked. The forward ends of the other cylinders are open, and the back ends of all the cylinders are alternately opened to the compressed-air or steam supply and to the exhaust by valves worked by a separate engine at the rear end of the machine. By this means the cutter-head is moved to and fro with short quick strokes, and any desired amount of power can be applied to it, according to the number of cylinders employed. In rear of the last cylinder the ram passes through an internal-toothed wheel, by means of which a slow revolving motion is given to it. In rear of this wheel is a small engine worked by compressed air or steam. The crank-shaft of this engine is at right angles to the ram, and has upon it a worm gearing into a worm-wheel upon a strong shaft, which, at its rear end, can be clutched to the end of a long screw, which passes backward from the rear end of the machine, and works in a long nut very firmly fixed to the rock. By this means the machine is moved forward or backward. The shaft at its forward end carries a pinion to drive an intermediate shaft, from which motion is transmitted to the internal-toothed wheel before mentioned, which is to give the slow revolving motion to the ram.

The small engine at the rear end of the machine also gives a to-and-fro motion to slide-valves, by which compressed air or steam is alternately admitted to, and allowed to escape from, the back ends of all the cylinders used for giving the to-and-fro motion to the ram. This slide-valve is constructed in such a manner that the cutter-head is caused to make two strokes for each revolution of the small engine.

Inclined shafts may be sunk by the same apparatus, and for vertical shafts a suspended machine may be employed.

In order that my said invention may be most fully understood and readily carried into effect I will proceed to describe the drawings hereunto annexed.

Figure 2:
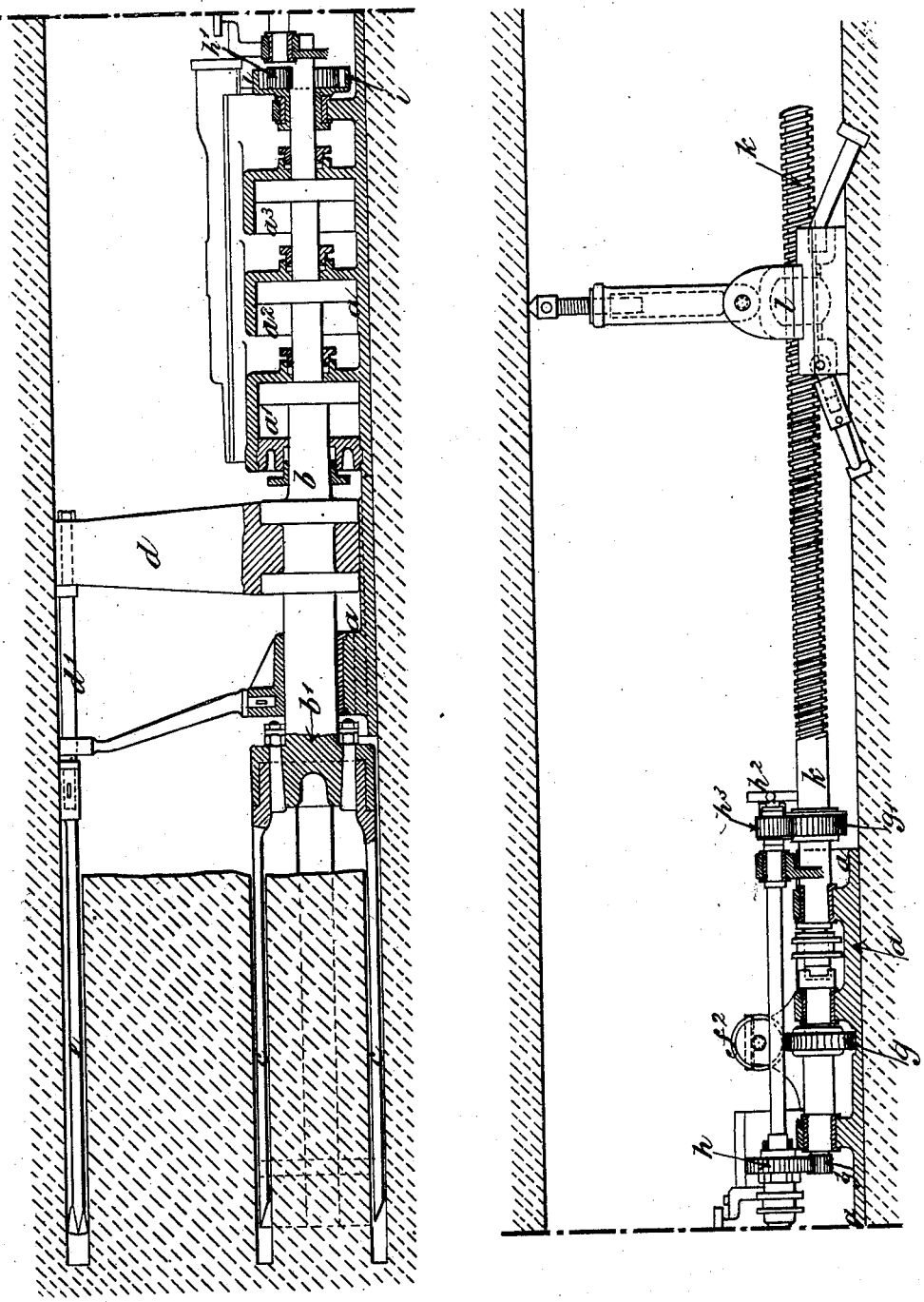
Figure 3:
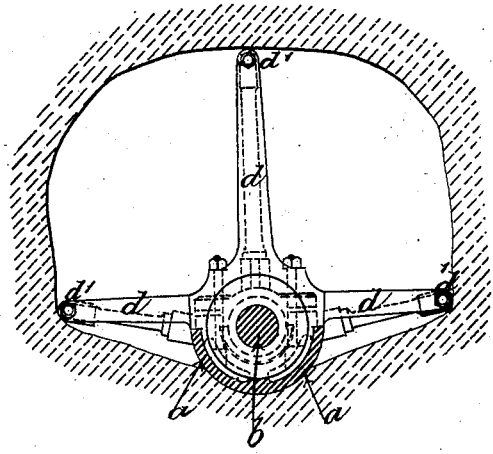
Figure 4:
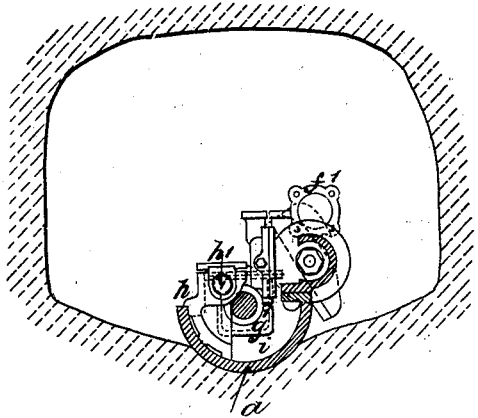
Figure 5:
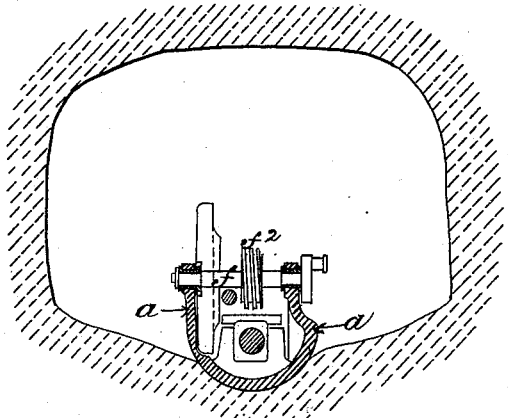
Figure 6:
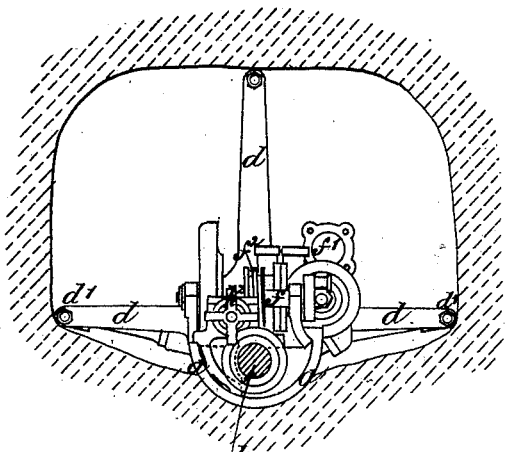

Figure 1 is a plan of a machine constructed according to my invention. It is adapted for tunneling and shaft-sinking in hard rock. Fig. 2 is a longitudinal section of the same. Figs. 3, 4, and 5 are transverse sections taken on the lines A B C D and E F in Fig. 1, respectively. Fig. 6 is an end elevation.

Figure 7:
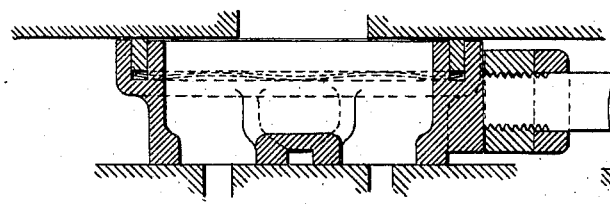
Figure 8:
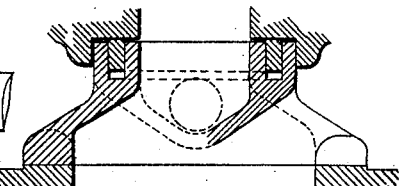

$a\ a$ is the main frame or bed of the machine. Its form on the under side is semi-cylindrical, and its curvature is the same as that of the groove left at the bottom of the hole by the cutting-head, so that the machine, when at work, rests with perfect steadiness in this groove, and when moved forward maintains a true line with but little care on the part of the workman. $a^1\ a^2\ a^3$ are three cylinders. They are made in two parts, and the lower portions are cast with the frame. In each of the cylinders there is a piston, and these pistons are formed on the ram $b$, which, when actuated by compressed air or steam admitted to the cylinders, traverses to and fro for a short distance in the bearings, in which it is carried. On the end of the ram is the head $b^1$, in which the chisels $c$ are fixed. An annular groove is formed in the head to receive the rear ends of the chisels, which are shaped to a dovetail form, and when inserted into the groove they butt solidly one against the other. The chisels are held in their places by two curved wedge-pieces, which are drawn home and locked each by two nuts, one right-handed and one left-handed, screwed onto their stems. These nuts are prevented from shaking loose by a metal keep outside both the nuts, which is retained in its place by a rim on the outer nut and an india-rubber ring or spring over the inner nut. Gaps are left in the ring of chisels, one on each side, say, for one-sixth of the circumference, or rather less, so that the chisels may be put in with facility and a free escape afforded to the débris. Along these spaces also water-pipes (not shown in the drawings) are led, and jets of water under heavy pressure are thrown into the groove cut in the rock, to wash away the débris. The stems of the chisels are so formed that they fit closely, the one to the other, and it is better that their sides should be shaped so as to lock together in such a way as to prevent the stems bending independently of the chisels on either side. The chisels are hooped together near their cutting-edges. Filling-pieces are inserted into the gaps in the ring of chisels both where they enter the head of the ram and within the hoop, care being taken in the latter case so to arrange them that they may not interfere with the flow of water and débris. The edges of the chisels, it will be observed, are set circumferentially and alternately on the inner and outer side to the annular groove, which they cut so that the actual cuts are very narrow, and the rock flakes away between them; or, if necessary, a shorter cutter may be introduced to clear away any ridge which may form. $d\ d$ are arms, firmly connected with the head, but in such a way that the head can rotate independently of them. They carry at their ends tool-holders $d^1$, which pass through guides to steady them as they slide to and fro. In these tool-holders the borers $e\ e$ are fixed. They are chisels with cutting-edges of peculiar form—a cross with a ring around it—and there are openings for the passage-way of the débris in the spaces between the cross-cutting edges. These tools penetrate the rock simultaneously with the cutting-head. They may be made to rotate, if necessary. A strong jet of water is thrown into the holes which they produce, to wash away the débris. The tool may conveniently be made hollow for the passage of the water. The compressed air or steam to actuate the ram is admitted to the cylinders $a^1\ a^2\ a^3$ by means of three valves. A longitudinal section of one of them is shown to a larger scale at Fig. 7, and a transverse section at Fig. 8. These valves are connected directly to the piston-rod of a donkey-engine, the crank-shaft of which is seen at $f$. Each traverse of the valves admits and exhausts the air or steam to and from the cylinders, so that the strokes of the ram occur twice as frequently as the revolutions of the donkey-engine. The return of the ram each time the exhaust is opened results from the cylinder $a^1$ being closed at the front and a constant back pressure of air or steam being maintained on the front of the piston. In practice, the ram may thus, conveniently in some cases, be worked at a speed as high as six hundred stokes a minute, or even more.

The ports leading to the cylinders are double, and the valves are made to correspond, as it is essential to rapid working that the air or steam passages should be as free as possible. $f^1$ is the cylinder of the donkey-engine. Its piston drives the crank-shaft $f$ in the usual way by a connecting-rod. An eccentric on the crank-shaft works the valve. $f^2$ is a worm on the crank-shaft. It drives a worm-wheel, $g$, on the shaft of which is a pinion, $g^1$, driving a wheel, $h$, which, when held in gear by a clutch, drives a pinion, $h^1$, on its shaft, and this in turn gives motion to a wheel with internal teeth $i$ on a hollow axis carried in a bearing on a frame, and through which the ram $b$ passes. The ram and the hollow axis engage together by means of grooves and feathers, so that as the wheel $i$ slowly rotates it carries the ram with it.

On the rear end of the shaft of the worm-wheel $g$ there is a clutch by which it can be made to engage with a screw, $k$, the fore end of which is held in a bearing on the frame, and the rear end works through a massive nut, $l$, which is made fast in rear of the machine. The nut is mounted on a block shaped to the curve of the groove left in the rock by the cutting-head. This block is jammed down in its place by a screw-jack from above, and is strutted so as to prevent longitudinal movement by screw-struts both before and behind.

By the rotation of the screw $k$ obtained in the manner already described, the whole machine can be moved at a comparatively rapid rate to and from the face of the rock. When the machine is at work, however, a slower forward or feed motion is required to move the frame forward at the rate at which the cutters are able to penetrate the rock. The workman tending the machine makes it follow the progress of the chisels by means of a hand-wheel, $h^2$, which, operating on a friction-clutch, serves to clutch and unclutch the toothed pinion $h^3$ carried on the axis of the wheel $h$, and the wheel $h^3$ gears with a wheel of larger size, on the axis of the screw $k$. A little rod is connected with the hinder piston, and leads back to the rear of the machines. It serves as an indicator to inform the workman when to throw the feed into and out of gear.

By the means described the cuts are made to penetrate to a depth of four, five, or more feet into the rock, according to the nature of the material, and then the machine is drawn back a sufficient distance to be out of the way. Small charges of dynamite or other explosive are then placed in the holes produced by the borers $e$, and the holes are closed by clay or wedges, three steel wedges together forming a cylinder, being inserted into each hole with the base of the center wedge toward the charge. The two lateral charges are first fired, and immediately afterward the charge in the upper hole. The pieces of rock are brought back by a trolly working on a temporary tramway laid down in one piece on the left-hand side of the machine, and this having been done the machine is run back again to its work, advantage having been taken of the delay to change the chisels and borers if it should be found necessary. In this way very rapid progress can be made.

Figure 11:
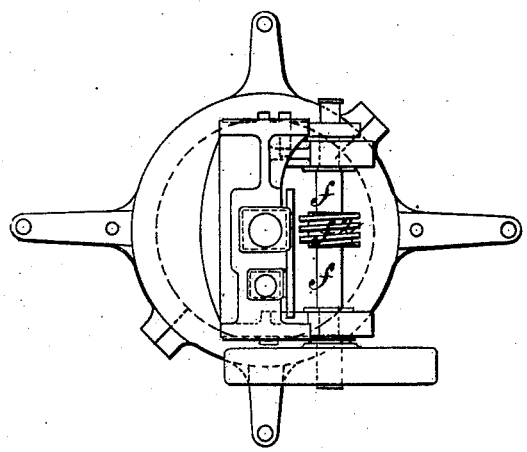

Fig. 9 is a side elevation, and Fig. 10 is a longitudinal section, of a machine adapted for sinking shafts. Fig. 11 is an end elevation of the same. The machine is so similar to that already described, and it is so clearly represented in the drawings that it is unnecessary to describe the drawings in detail, and it will suffice to direct attention to those points in which differences of importance between the two machines occur. The frame of this machine is not adapted to run in the groove produced by the cutting-head; but it is guided as the work progresses by guide-wheels fixed to it at either end.

Figure 12:
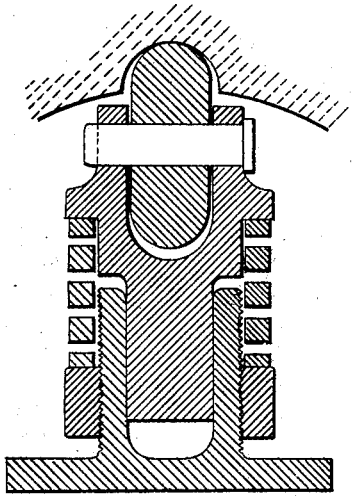

The detail of one of these guide-wheels is shown at Fig. 12. It is furnished with a strong spring, as is shown, enabling the wheel to yield to slight inequalities in the surface over which it runs. These guide-wheels are arranged to run in the grooves left by the borers $e$, of which, in this machine, there are four in place of three. One pair of borers, opposite the one to the other, are shorter than the others, and the charges in the holes which they produce are fired first. They clear the way for the more distant holes to operate efficiently. The machine is furnished with but one air or steam cylinder, the circumstances admitting of this cylinder being made of any size deemed requisite. The whole machine is suspended from the screw $k$, which at its upper end is held in a nut contained in a frame, which, by rigid struts set up with screws, is firmly fixed in the center of the shaft at a short distance above the machine. A portion of the weight of the machine may conveniently be borne by a wire rope passing over a pulley, and having counter-weights attached.

Letters Patent have been granted to me in England, by Her Majesty, the Queen of Great Britain, bearing date the 25th day of February, 1876, and numbered 794, for fourteen years.

Having thus described the nature of my said invention, and the manner of performing the same, I would have it understood that I do not confine myself to the exact details detailed described; but

I claim—

1. The hereinbefore-described method of boring or tunneling rock, which consists in cutting a small annular groove or main bore, simultaneously forming holes at the sides and top of the bore, and then enlarging the bore by exploding charges in these holes, substantially as hereinbefore set forth.

2. The hereinbefore-described method of boring or tunneling rock, which consists in cutting an annular groove or main bore, enlarging the upper part and sides of the bore, and preserving the lower part, constituting a way to support the machine, and in which it can be moved to and fro, substantially as hereinbefore set forth.

3. The main frame or bed of the machine, constructed of a curved or semi-cylindrical form on the under side, to adapt it to fit within the groove formed at the bottom of the bore, and traverse along it in a straight line, substantially as hereinbefore set forth.

4. The combination, substantially as hereinbefore set forth, of a ram, a cutting-head actuated thereby, and a series of borers also actuated by the ram, and forming holes round the annular groove cut by the said head, whereby the rock between the annular groove and the holes formed by the borers may be forced in by explosive charges, and the amount of work required to win a large bore greatly reduced.

5. In a rock-boring or tunneling machine, the combination, substantially as hereinbefore set forth, of the ram, the cutting-head, and the main frame or bed, provided with two or more cylinders for actuating the ram, in the manner described.

6. The cutting-head, constructed substantially as hereinbefore described, with cutters having their edges set circumferentially to the annular groove to be cut.

H. N. PENRICE.

Witnesses:
WILMER M. HARRIS,
JNO. DEAN,
Both of No. 17 Gracechurch Street, London.